United States Patent
Cheng

(10) Patent No.: US 10,202,520 B2
(45) Date of Patent: Feb. 12, 2019

(54) MULTI-FUNCTION SOFT WALL AND MANUFACTURING METHOD THEREOF

(71) Applicant: NINGBO CALLDE BIOMIMETICS MATERIALS CO., LTD., Cixi, Zhejiang Province (CN)

(72) Inventor: Huimin Cheng, Cixi (CN)

(73) Assignee: NINGBO CALLDE BIOMIMETICS MATERIALS CO., LTD., Cixi, Zhejiang Province (CN)

( * ) Notice: Subject to any disclaimer, the term of this patent is extended or adjusted under 35 U.S.C. 154(b) by 0 days.

(21) Appl. No.: 14/890,306

(22) PCT Filed: Apr. 28, 2014

(86) PCT No.: PCT/CN2014/076351
§ 371 (c)(1),
(2) Date: Nov. 10, 2015

(87) PCT Pub. No.: WO2015/007113
PCT Pub. Date: Jan. 22, 2015

(65) Prior Publication Data
US 2016/0130465 A1    May 12, 2016

(30) Foreign Application Priority Data

Jul. 17, 2013 (CN) .......................... 2013 1 0299905
Jul. 17, 2013 (CN) .......................... 2013 1 0301498

(51) Int. Cl.
*B05D 3/00* (2006.01)
*B05D 7/00* (2006.01)
(Continued)

(52) U.S. Cl.
CPC ........... *C09D 175/04* (2013.01); *B05D 3/007* (2013.01); *B05D 7/50* (2013.01); *B29C 44/06* (2013.01);
(Continued)

(58) Field of Classification Search
None
See application file for complete search history.

(56) References Cited

U.S. PATENT DOCUMENTS 6,893,695 B2 * 5/2005 Baychar ................. A41D 27/02
                                                                   36/43
2013/0059146 A1 * 3/2013 Lee ............................ B32B 5/32
                                                                   428/316.6
(Continued)

FOREIGN PATENT DOCUMENTS

CN          1386550 A      12/2002
CN          102505820 A     6/2012
(Continued)

OTHER PUBLICATIONS

International Search Report for Application No. PCT/CN2014/076351 dated Jul. 16, 2014.
(Continued)

*Primary Examiner* — Laura C Powers
(74) *Attorney, Agent, or Firm* — Jenkins, Wilson, Taylor & Hunt, P.A.

(57) ABSTRACT

The invention discloses a multi-function soft wall, comprising a surface printing layer and a base material, the base material further including a top layer, and a second layer, a third layer and a bottom layer that are all foaming layers, wherein both the second layer and the third layer have a foaming ratio less than that of the bottom layer, and a fiber layer is disposed between the third layer and the bottom layer. The invention further provides a method of manufacturing a multi-function soft wall, comprising: sequentially coating a top layer, a second layer, a third layer, a fiber layer and a bottom layer on a release paper, respectively, and then obtaining a base material, and performing a foaming process with respect to the second layer, the third layer and the bottom layer, respectively, and performing a drying and (Continued)

cooling process after the coating step; and separating the base material from the release paper, and printing a surface printing layer on the top layer. The multi-function soft wall can release negative ions, and continuously eliminate various pollutions indoors.

7 Claims, 2 Drawing Sheets

(51) Int. Cl.
| | |
|---|---|
| B32B 5/24 | (2006.01) |
| B32B 7/06 | (2006.01) |
| B32B 7/12 | (2006.01) |
| C08K 3/08 | (2006.01) |
| C08K 3/22 | (2006.01) |
| C08K 3/26 | (2006.01) |
| C08K 3/34 | (2006.01) |
| C08K 3/36 | (2006.01) |
| C08K 3/38 | (2006.01) |
| C08K 5/09 | (2006.01) |
| C08K 5/12 | (2006.01) |
| B29C 44/06 | (2006.01) |
| B32B 29/00 | (2006.01) |
| B32B 37/02 | (2006.01) |
| B32B 38/00 | (2006.01) |
| C09D 127/06 | (2006.01) |
| C09D 175/04 | (2006.01) |

(52) U.S. Cl.
CPC ............ *B32B 5/245* (2013.01); *B32B 7/06* (2013.01); *B32B 7/12* (2013.01); *B32B 29/007* (2013.01); *B32B 37/02* (2013.01); *C09D 127/06* (2013.01); *B32B 2038/0084* (2013.01); *B32B 2307/304* (2013.01); *B32B 2307/4026* (2013.01); *B32B 2607/02* (2013.01); *C08G 2150/90* (2013.01); *C08K 3/08* (2013.01); *C08K 3/22* (2013.01); *C08K 3/2279* (2013.01); *C08K 3/26* (2013.01); *C08K 3/34* (2013.01); *C08K 3/38* (2013.01); *C08K 5/09* (2013.01); *C08K 5/12* (2013.01); *C08K 2003/2296* (2013.01); *C08K 2003/265* (2013.01)

(56) References Cited

U.S. PATENT DOCUMENTS

2013/0310472 A1 11/2013 Becker et al.
2014/0259456 A1* 9/2014 Harris .................... D06P 5/001
8/445

FOREIGN PATENT DOCUMENTS

| | | |
|---|---|---|
| CN | 103072346 A | 5/2013 |
| CN | 103375003 A | 10/2013 |
| CN | 103382758 A | 11/2013 |
| CN | 103485503 A | 1/2014 |
| CN | 103603206 A | 2/2014 |
| WO | WO 2012/069287 A1 | 5/2012 |

OTHER PUBLICATIONS

English Translation of the IPRP and Written Opinion for Application No. PCT/CN2014/076351 dated Jan. 19, 2016.

* cited by examiner

MULTI-FUNCTION SOFT WALL AND MANUFACTURING METHOD THEREOF

TECHNICAL FIELD

The invention relates to a technical field of decoration materials and particularly, concerns on a multi-function soft wall and a manufacturing method thereof.

BACKGROUND ART

With improvement of the people's living standards, more and more families adopt a high-grade decoration where double glazing is used, and home air-conditioning is installed. The upgraded decoration is not only beautiful and dignified on vision but also quite warm in winters and cool in summers on body feelings. However, people do not know it becomes a direct inducement of indoor pollutions and seriously influences people's health. Generally speaking, the indoor pollutions mainly include chemical pollution, biological pollution and physical pollution, etc.

Chemical Pollution: Decorations and furnishings always release chemical gases such as methanal and benzene, etc, which will stimulate a person's eyes, nose, throat and skin, and further cause several bad symptoms such as streaming eyes, a runny nose, a cough and sneeze, etc. Living in the polluted air over a long period of time will further cause chronic bronchitis, bronchial asthma, pneumonectasis, or even lung cancer and nasopharyngeal cancer. As can be seen, the more luxurious the decoration of the room is, the more serious the air pollution might be. In addition, the harm of smoking is tremendous. The smoke fog contains more than 40 kinds of carcinogenic substances, and the number of people who die from the lung cancer due to smoking is about 10 times or more as large as the number of people who do not smoke but die from the lung cancer.

Biological pollution: A thick layer of dusts will be stacked on air conditioners and ventilating pipes after a long term use, and under a proper temperature, these places become breeding grounds for bacteria. The wind blown out from the air conditioner becomes a carrier of pathogen transmission. Particularly in a crowded environment with poor ventilation, respiratory infectious diseases such as influenza, measles and tuberculosis can be easily spread. Once winter comes, some persons repeatedly develop "cold" symptoms of a dry nasal cavity, an itching throat, and an occasional small amount of clear phlegm. It will not bring an obvious effect when taking cold medicines. It is just because the indoor disease source is not eliminated, which makes a person be infected repeatedly and be not well all the time. In addition, pets such as cats and dogs fed by residents will cause a mass propagation of microorganisms (including bacteria, virus, fungus, gemma, mycete, acarus, etc.).

Physical pollution: In areas where the air quality is not very good, there will be a layer of dusts on tables if without being wiped for two days. Actually more dusts (less than 2.5 micrometers) invisible to the naked eye are suspending in the air or even have been breathed into lungs by people. In fact, the dust concentration of the indoor air is higher than that of the outdoor air, but the outdoor pollutions are the dust sources of the indoor air, particularly for the buildings near roads or highways, exhaust gases discharged from vehicles become a serious pollution source of plumbum and cadmium of the indoor air. Generally speaking, dust removal by ventilation is one of the most effective and convenient measures to reduce the indoor air pollution. However since most of houses have a poor ventilation condition, more and more indoor dusts are accumulated. In addition, with respect to houses near a pollution source, it is not advised to open windows frequently. Therefore people are generally in a dilemma as for whether to open the windows or not.

Oxygen deficiency pollution: Air conditioners are used most frequently in winters and summers, and people always close the doors and windows tightly to achieve a better "air conditioning effect". It is hardly realized that such behavior is most likely to result in indoor hypoxia. During lack of oxygen, carbonic acid concentration in the blood of a person increases, which leads to insufficiency of cerebral blood supply, heavy headache, choking sensation in chest, and cold feelings of hands and feet. Due to the lack of oxygen, students will be sleepy and lack of concentration; women will have prematurely aged faces; working persons will have a greatly reduced working efficiency; A fetus will be cerebral paralysis or even dead because of the lacks of oxygen of pregnant women; and old people will have aggravated heart loads and will be caused to die in more serious cases.

An impact of negative ions to the nervous system of human beings can reinforce the function of cerebral cortex and mental activities. At the same time persons will feel refresh and working efficiency is increased the sleep quality can be improved accordingly. What's more the negative ions can further enhance the strength of the oxidation process of the brain tissues, and make brain tissues obtain more oxygen. Also negative ions can produce similar impact to the cardiovascular system of human beings.

As observed by some scholars, negative ions have an obvious function of expanding blood vessels. They can relieve arterial spasm and achieve the purpose of reducing the blood pressure. Also negative ions are of great benefits to improve heart function and myocardial nutrition, which are beneficial to recovery of patients with hypertension sickness and cardiovascular and cerebrovascular diseases. The negative ions can bring good effect to blood system of human beings. It is verified by studies that negative ions have an outstanding functions of slowing the blood flow and extending the coagulation time. They can increase the oxygen content in the blood, which facilitates transmission, absorption and utilization of blood oxygen. In addition, the impact of negative ions on the respiratory system is the most obvious since negative ions enter the body of human beings through the respiratory passage, by which the lung capacity of human beings can be greatly improved. Someone has conducted an experiment by sucking air negative ions into a glass mask for 30 minutes and the result shows that the amount of oxygen absorbed by the lungs is increased by 2% and the amount of exhausted carbon dioxide is increased by 14.5%. Therefore it is clear that negative ions have great functions of improving and strengthening the lung function. Since negative ions are of great benefit to the human health, people always get a negative ion air cleaner in order to resolve the problem that negative ions in office and house environments are lack, by this way people can absorb "air vitamins" as they like in the areas where they are.

However, the air cleaner is a kind of mechanical product, occupying physical space, consuming energies, having a higher cost and obtaining lower efficiency. In addition, difference size of the air cleaner may be selected. Sometimes, the negative ions cannot be spread in the entire living space in a full range when using a small sized air cleaner.

To sum up, a decoration or an ornament material that can release negative ions is urgently required to continuously eliminate various indoor pollutions so as to guarantee a healthy space where the human is living.

SUMMARY

The main object of the invention is to provide a multi-function soft wall and a manufacturing method thereof to resolve the above problem existing in prior arts, wherein:

According to the embodiment of the invention, a multi-function soft wall is provided, comprising: a surface printing layer; and a base material which includes a top layer, a second layer, a third layer and a bottom layer and said second layer, third layer and bottom layer are all foaming layers, and both said second layer and third layer having a foaming ratio less than that of said bottom layer; and a fiber layer that is configured between said third layer and bottom layer.

Further, a formulation of the top layer includes a nanocrystal.

Further, the formulation of the top layer includes: 60%-90% of PU resin material, 1%-6% of nano-size rare earth, 5%-20% of nano-size tourmaline, 2%-7% of nano-size medical stone, and 2%-7% of nano-size quartz.

Further, the formulation of the second layer includes: 100 parts of PVC resin, 80 parts or less of dioctyl terephthalate, 40 parts or less of zeolite powder, 40 parts or less of calcium carbonate powder, 2.7 parts of composite stearic acid stabilizer, 15 parts or less of antimonous oxide, 2.5 parts of ACT foaming agent, and 2.5 parts of zinc oxide, on the resin basis.

Preferably, the second layer is provided with a coating thickness of 20-25 um and a foaming ratio of 1.2-1.8 times.

Further, the formulation of the third layer includes: 100 parts of M31, 60-100 parts of BET, 2 parts of ACK, 10 parts of antimonous oxide, 20 parts of diatomite, 5 parts of epoxidized soybean oil, and 2.7 parts of organic tin.

Preferably, the third layer is provided with a coating thickness of 12 um and a foaming ratio of 1.2-1.8 times.

Further, the formulation of the bottom layer includes: 100 parts of PVC resin, 90 parts or less of dioctyl terephthalate, 40 parts or less of zeolite powder; 80 parts or less of calcium carbonate, 2.7 parts of composite stearic acid stabilizer, 15 parts or less of antimonous oxide, and 3.5 parts of ACT foaming agent, on the resin basis.

Preferably, the bottom layer is provided with a coating thickness of 25-30 um and a foaming ratio of 2.4-3 times.

Further the ACT foaming agent is provided with fillers, which include an open porous foaming agent and diatomite.

A method of manufacturing the multi-function soft wall is also provided, which comprising: sequentially coating a top layer, a second layer, a third layer, a fiber layer and a bottom layer on a release paper, respectively, then obtaining a base material, wherein a foaming process is performed to said second layer, third layer and bottom layer, respectively, and a drying process and a cooling process are performed after each coating step; and separating the base material from the release paper, and printing a surface printing layer on the top layer.

Further ingredients in a formulation of said top layer include nanocrystal.

Further, the top layer is provided according to a formulation below: 60%-90% of PU resin material, 1%-6% of nano-size rare earth, 5%-20% of nano-size tourmaline, 2%-7% of nano-size Maifan stone, and 2%-7% of nano-size quartz.

Further the second layer is provided according to a formulation below: 100 parts of PVC resin, 80 parts or less of dioctyl terephthalate, 40 parts or less of zeolite powder, 40 parts or less of calcium carbonate powder, 2.7 parts of composite stearic acid stabilizer, 15 parts or less of antimonous oxide, 2.5 parts of ACT foaming agent, and 2.5 parts of zinc oxide, on the resin basis.

Preferably the second layer is provided with a coating thickness of 20-25 um and a foaming ratio of 1.2-1.8 times.

A formulation of the third layer includes: 100 parts of M31, 60-100 parts of BET, 2 parts of ACK, 10 parts of antimonous oxide, 20 parts of diatomite, 5 parts of epoxidized soybean oil, and 2.7 parts of organic tin.

Preferably the third layer is provided with a coating thickness of 12 um and a foaming ratio of 1.2-1.8 times.

The bottom layer is provided according to a formulation below: 100 parts of PVC resin, 90 parts or less of dioctyl terephthalate, 40 parts or less of zeolite powder; 80 parts or less of calcium carbonate, 2.7 parts of composite stearic acid stabilizer, 15 parts or less of antimonous oxide, and 3.5 parts of ACT foaming agent, on the resin basis.

Preferably, the bottom layer is provided with a coating thickness of 25-30 um and a foaming ratio of 2.4-3 times.

By technical solutions disclosed in the invention, the following technical effects can be achieved:

(1) The soft wall is provided with a dense surface and a sparse bottom, to which a requirement for post-processing and embossing can be satisfied in the case that the entire density of the soft wall is comparatively lower. What's more, it overcomes a defect of warp of edges during the work progress.

(2) The soft wall is provided by an open-cell porous foaming technique and a diatomite material is added to the formulation therefore it makes possible to obtain a waterproofed and moisture-proofed soft wall with slight breathability. What's more, it also has a function of absorbing harmful gases such as methanal, etc.

(3) Negative ions can be effectively released to the air. Some test results show that the surface air negative ions can reach 2,000-10,000/cm$^3$ or more where a relative humidity is 60% or more.

BRIEF DESCRIPTION OF THE DRAWINGS

The figures illustrated herein are used for providing a further understanding of the invention, and form a part of the application, and schematic embodiments of the invention and descriptions thereof are used for explaining the invention, and do not form improper limitations of the invention. In the Drawings.

DETAILED DESCRIPTION

The invention mainly utilizes vibrations of air pressure and air temperature to make nanocrystal in a material cause an electric discharge in order to ionize the air to produce negative ions. As along as the surface of a soft wall contacts the air, negative ions having a small particle diameter can be released to a space, whose concentration fluctuation in a space can reach 1,500-10,000/cc or more. The negative ions are capable of reducing various pollutions produced by house decorations effectively, and have multiple functions such as refreshing air, resisting water, resisting mycete, breathing, keeping warm, insulating sound and inflaming retarding, etc.

Figure 1:
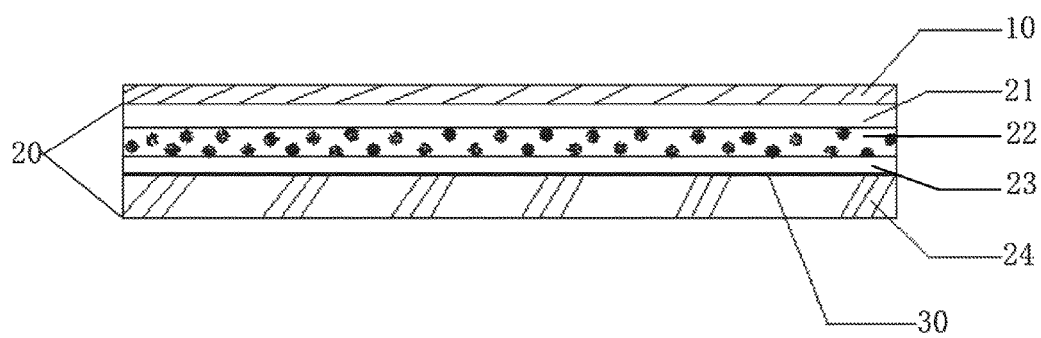
FIG. 1 is a schematic diagram of a structure of a multi-function soft wall according to an embodiment of the invention; and, FIG. 2 is a schematic diagram of a method of manufacturing a multi-function soft wall according to an embodiment of the invention.

In order to make it clearer on the purpose, technical solution and advantages of the invention, the figures combining with the embodiments are taken into consideration to make further disclosure of the invention below:

According to an embodiment of the invention, a multi-function soft wall is provided, referring to FIG. 1, which comprises: a surface printing layer 10 and a base material 20. Wherein, the base material further includes a top layer 21, a second layer 22, a third layer 23 and a bottom layer 24. The second layer 22, the third layer 23 and the bottom layer 24 are all foaming layers. A fiber layer 30 is provided between the third layer 23 and the bottom layer 24, which is capable of enhancing the intension of the soft wall and controlling the soft wall to be stretched and shrunk in longitudinal and transverse directions.

Wherein, the fiber layer 30 can be made from a fiberglass cloth (BF), and the adoption of the fiberglass cloth (BF) to serve as an reinforcement layer of the soft wall between the foaming layers is capable of making the soft wall have both a strength and a flexibility, and of reducing the weight of the soft wall and improving the heat-insulating and sound-insulating capabilities of the soft wall. What's more, the adoption of the fiberglass cloth to serve as an intermediate layer of the product makes the soft wall have a favorable stability, which can effectively improve a post-processing capability, increase the strength of the product and prevent a gap produced by expansion with heat and contraction with cold when the product is used.

The top layer 21 disclosed in the invention is a PU (Polyurethane) or TPU (Thermoplastic polyurethane) layer having a coating of 150 g with a processing temperature of 120° C. The top layer 21 has a function of preventing corrosion. In addition, a certain amount of negative ion powders to the formulation of the top layer enables the product to release the negative ions. Under a condition where a relative humidity of the air is 68% or more, a surface air negative ion concentration can reach 2,000-10,000/cc or more. Specifically, a component in a formulation of the top layer includes a nanocrystal, wherein the top layer is provided according to a formulation below: 60%-90% of PU resin material, 1%-6% of nanoscale rare earth, 5%-20% of nanoscale tourmaline, 2%-7% of nanoscale Maifan stone, and 2%-7% of nanoscale quartz. The nanoscale Maifan stone is also called as nanoscale medical stone, medicinal stone or Maifanshi.

In one embodiment, the top layer 21 can be provided the according to the formulation below: 65%-80% of PU resin material, 2%-4% of nanoscale rare earth, 13%-18% of nanoscale tourmaline, 2.5%-6.5% of nanoscale Maifan stone, and 2.5%-6.5% of nanoscale quartz.

Further, the top layer 21 is preferably provided according to a formulation below: 70% of PU resin material, 3% of nanoscale rare earth, 16% of nanoscale tourmaline, 5.5% of nanoscale Maifan stone, and 5.5% of nanoscale quartz.

The second layer 22 of the invention is made from foggy PVC having a coating thickness of 20-25 um with a processing temperature of 160° C. Specifically, the formulation of the second layer 22 is as follows: 100 parts of PVC resin, 80 parts or less of dioctyl terephthalate, 40 parts or less of zeolite powder, 40 parts or less of calcium carbonate powder, 2.7 parts of composite stearic acid stabilizer, 15 parts or less of antimonous oxide, 2.5 parts of ACT foaming agent, 2.5 parts of zinc oxide, and a proper amount of pigment, wherein the resin is taken as a standard. Here ACK refers to azodicarbonamide and ACT is an improved type of ACK and is an open-cell porous foaming agent. The second layer 22 has a foaming capacity of 1.2-1.8 times, preferably 1.5 times. By controlling the foaming capacity within a comparatively lower degree, it will be benefit for increasing support strength of the surface in order to achieve a satisfied printing and embossing effect.

The third layer 23 of the invention is a foggy PVC adhesive layer (which is used to adhere the fiberglass cloth) having a coating of 12 um with a processing temperature of 150-160° C., and a foaming capacity of 1.2-1.8 times. The object of foaming is to ensure that the third layer is porous and permeable to air, and to reduce the weight of the product, improve heat-insulating and sound-insulating capabilities. Also by controlling the foaming capacity a satisfied embossing effect can be obtained.

The third layer 23 (adhesive layer) has a coating thickness of 12 um with a processing temperature of 150-160° C. Specifically, the formulation of the third layer 23 is as follows: 100 parts of M31, 60-100 parts of BET, 2 parts of ACK, 10 parts of antimonous oxide, 20 parts of diatomite, 5 parts of epoxidized soybean oil, 2.7 parts of organic tin, and a proper amount of pigment. Wherein, M31 refers to a kind of resin, and BET refers to dioctyl terephthalate. The third layer has a foaming ratio of 1.2-1.8 times, preferably 1.5 times. By controlling the foaming ratio within a comparatively lower degree, the fiber layer, e.g., the fiberglass cloth, etc can be adhered easily. Here the foaming agent is also added to the adhesive layer. The adhesive layer and the layer 22 constitute one layer, which can reduce the weight of the product and improve the flexibility of the product. By this way, it can form through holes between the layer 22 and the layer 24 of the product.

An addition of the diatomite to the formulation and an adoption of a once-completed foaming process can make foams and pores of the entire product interconnected for the purpose of being permeable to air. It makes the product have properties of breathing air, permeating moisture, balancing moisture regain rate and water retention rate to adjust the humidity. What's more it makes the product have an ultra-strong absorption capacity and a function of absorbing harmful substances such as methanal, benzene, methylbenzene and ammonia, and also a function of deodorant.

The bottom layer 24 (high foaming layer) of the invention has a coating thickness of 25-30 um, preferably 28 um with a processing temperature of 180-200° C., and has a foaming ratio of 2.4-3 times, preferably 2.5 times. The high foaming layer can increase a thickness of inner space of the soft wall, then improve heat-insulating and sound-insulating performances and have foams and pores interconnected to achieve the effect of breathability of air, and further have a function of absorbing harmful gases such as methanal, etc.

The bottom layer 24 (high foaming layer) has a coating thickness of 25-30 um, preferably 28 um with a processing temperature of 180-200° C. Specifically, a formulation of the bottom layer is as follows: 100 parts of PVC resin, 90 parts or less of dioctyl terephthalate, 40 parts or less of zeolite powder; 80 parts or less of calcium carbonate, 2.7 parts of composite stearic acid stabilizer, 15 parts or less of antimonous oxide, and 3.5 parts of ACT foaming agent, wherein the resin is taken as a standard. The bottom layer 24 has a foaming ratio of 2.4-3 times. By controlling a comparatively higher foaming ratio, the density of the base material can be reduced, and heat-insulating and sound-insulating performances are greatly improved.

The multi-function wall is then produced after a surface color-mixing process by which a surface coloring layer or a surface printing layer is formed. The surface coloring layer or printing layer is also called as decoration layer which is decorated on the wall surface with good flexibility and tactility and with outstanding heat-insulating and sound-insulating performances and also with antibacterial, mildew resistant and waterproofing functions. The flame resistance grade can come to a level B1. The product also has a function of releasing negative ions and the surface air negative ions can reach 1,000-10,000/cm$^3$ or more. Massive negative ions can be released to the space. The product itself meets environmental protection requirements.

By the formulations of the respective layers adopting different foaming agent amounts to control the foaming, it reaches lower or higher gradient foaming among the second layer (low foaming layer), the third layer (low foaming layer) and the bottom layer (high foaming layer), which makes the base material of the soft wall have a dense and compact outside and a sparse and cancellous inside. It not only facilitates the embossing process to make the surface of the product satisfy aesthetic requirement, but also achieves the objects of heat insulation and sound insulation.

The foaming process adopts an open porous foaming technique and a modified open porous foaming agent and diatomite are used as fillers to make the foams and the pores be interconnected, so that the soft wall has a micro breathability characteristic and is available of absorbing moisture in the air, and particularly in a damp weather, the wall surface does not have a drenched sense because of the function of breathability and can further absorb harmful gases such as methanal in the air.

Figure 2:
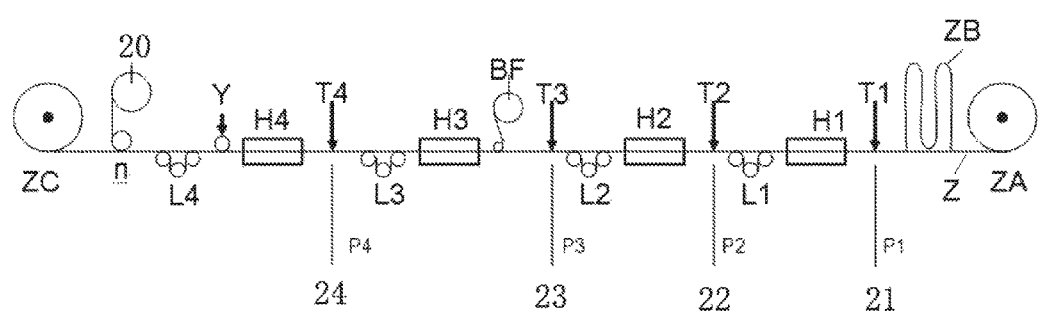

Referring to FIG. 2, the base material 20 includes a PU layer, i.e. a top layer 21, a second layer 22 (lower foaming layer), a third layer 23 (adhesive layer and lower foaming layer) that constitute a front of a base fabric, and a bottom layer 24 (high foaming layer) of the base fabric. Such base material is produced by a new process improved on the basis of a traditional release paper production line. T1, T2, T3 and T4 refer to coating tables. A carrier Z is a release paper and the entire base material is carried on the release paper for being processed. Here ZA is a release paper unwinder, ZB is a release paper storage rack, and ZC is a release paper carrier layer, i.e., a release paper reel. The release paper is coated via a coating table T1 according to formulation P1 to serve as the top layer. After drying process by a drying device H1 and cooling process by a cooling device L1, it enters to a coating table T2 and is coated according to formulation P2 to serve as the second layer. By a drying device H2 for drying process and then a cooling device L2 for cooling process, the release paper enters a coating table T3 and is coated according to formulation P3 to serve as the third layer (adhesive layer). Fiberglass cloth of BF is placed on the third layer 23 following by entering a drying device H3 for drying process and then a cooling device L3 for cooling process. Then it enters to a coating table T4 and is coated according to formulation P4 and then enters a drying oven H4 for being foamed. The coatings layers are synchronously foamed. Layer 22 by formulation P2 and layer 23 by formulation P3 are subjected to a lower foaming and layer 24 by formulation P4 is subjected to a higher foaming. After completion of foaming process, the release paper enters Y (rolling) to flatten the plane following by cooling process through a cooling device L4. The plane is rewound after being separated from the release paper Z at a place n, and the release paper ZB is rewound.

The manufacturing method of the invention and the structural features of the material correspond to each other and can be cross-referenced and will not be given unnecessary details here.

To sum up, the following technical effects can be achieved by technical solutions disclosed in the invention:

(1) The soft wall has a dense and compact surface and a sparse and cancellous bottom. A requirement for postprocessing and embossing can be satisfied in the case that the entire density of the surface of the soft wall is comparatively lower. What's more, it overcomes a defect of warp of edges during the work progress.

(2) As the soft wall adopts an open porous foaming technique and a diatomite material is added to the formulation, the soft wall has functions of resisting water and moisture, and micro breathability as well. It also has a function of absorbing harmful gases such as methanal, etc.

(3) Negative ions can be effectively released to the space, and surface air negative ions can reach 2000-10000/cm3 or more when a relative humidity is 60% or more.

The contents mentioned above are only embodiments of the invention and are not used for limiting the invention, and to those skilled in the art, the invention can be modified and changed in various manners. All amendments, equivalent substitutions, improvements and the like made within the spirit and principle of the invention should be contained within the scopes of the claims of the invention.

What is claimed is:

1. A multi-function soft wall, comprising:
 a printed layer; and
 a base material, including:
  a first layer;
  a second layer, a third layer, and a bottom layer, wherein the second layer, the third layer, and the bottom layer are all foaming layers, and wherein both the second layer and the third layer have a foaming ratio less than that of the bottom layer; and
  a fiber layer that is located between the third layer and the bottom layer,
  wherein ingredients in a formulation for the first layer include nanocrystals; and
  wherein the nanocrystals comprise at least nano-size rare earth, nano-size tourmaline, nano-size medical stone, and nano-size quartz, and wherein the formulation of the first layer includes, by weight percentage: 60%-90% of polyurethane resin material, 1%-6% of the nano-size rare earth, 5%-20% of the nano-size tourmaline, 2%-7% of the nano-size medical stone, and 2%-7% of the nano-size quartz.

2. The multi-function soft wall according to claim 1, wherein the formulation of the second layer includes, by weight: 100 parts of polyvinylchloride resin, 80 parts or less of dioctyl terephthalate, 40 parts or less of zeolite powder, 40 parts or less of calcium carbonate powder, 2.7 parts of composite stearic acid stabilizer, 15 parts or less of antimonous oxide, 2.5 parts of azodicarbonamide foaming agent, and 2.5 parts of zinc oxide, on a basis of the polyvinylchloride resin.

3. The multi-function soft wall according to claim 2, wherein the second layer comprises a thickness of 20-25 μm and a foaming ratio of 1.2-1.8 times.

4. The multi-function soft wall according to claim 1, wherein the third layer comprises a thickness of 12 μm and a foaming ratio of 1.2-1.8 times.

5. The multi-function soft wall according to claim 1, wherein the formulation of the bottom layer includes, by weight: 100 parts of polyvinylchloride resin, 90 parts or less of dioctyl terephthalate, 40 parts or less of zeolite powder; 80 parts or less of calcium carbonate, 2.7 parts of composite stearic acid stabilizer, 15 parts or less of antimonous oxide, and 3.5 parts of azodicarbonamide foaming agent, on a basis of the polyvinylchloride resin.

6. The multi-function soft wall according to claim 5, wherein the bottom layer comprises a thickness of 25-30 μm and a foaming ratio of 2.4-3 times.

7. The multi-function soft wall according to claim 2, wherein the azodicarbonamide foaming agent comprises fillers, which include diatomite.

* * * * *